United States Patent
Boguraev et al.

(10) Patent No.: US 11,520,813 B2
(45) Date of Patent: Dec. 6, 2022

(54) ENTAILMENT KNOWLEDGE BASE IN NATURAL LANGUAGE PROCESSING SYSTEMS

(71) Applicant: International Business Machines Corporation, Armonk, NY (US)

(72) Inventors: Branimir K. Boguraev, Bedford, NY (US); Jennifer Chu-Carroll, Dobbs Ferry, NY (US); Aditya A. Kalyanpur, Westwood, NJ (US); David J. McClosky, Ossining, NY (US); James W. Murdock, IV, Amawalk, NY (US); Siddharth A. Patwardhan, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 858 days.

(21) Appl. No.: 14/986,759

(22) Filed: Jan. 4, 2016

(65) Prior Publication Data
US 2017/0193088 A1    Jul. 6, 2017

(51) Int. Cl.
*G06F 16/22*    (2019.01)
*G06F 16/33*    (2019.01)
(Continued)

(52) U.S. Cl.
CPC .......... *G06F 16/3344* (2019.01); *G06F 16/22* (2019.01); *G06F 16/322* (2019.01);
(Continued)

(58) Field of Classification Search
CPC ............. G06F 17/30684; G06F 17/271; G06F 17/30675; G06F 17/30; G06F 16/30675;
(Continued)

(56) References Cited

U.S. PATENT DOCUMENTS 8,583,420 B2    11/2013    Tanev
2004/0254917 A1    12/2004    Brill
(Continued)

OTHER PUBLICATIONS

Akhmatova, "Textual Entailment Resolution via Atomic Propositions", In Proceedings of the First Pascal Challenges Workshop on Recognising Textual Entailment, Apr. 2005, 4 pages.
(Continued)

*Primary Examiner* — Hosain T Alam
*Assistant Examiner* — Tracy M McGhee
(74) *Attorney, Agent, or Firm* — Elliot J. Shine

(57) ABSTRACT

Generating textual entailment pair by a natural language processing (NLP) system. The NLP system receives two input texts, such as a question and a candidate answer. The NLP system queries a database and retrieves passages likely to include text that support the candidate answer. The NLP system generates parse trees and performs term matching on the passages and scores them according to the matching. The NLP system detects anchor pairs in the question and in the passage and aligns subgraphs (within the parse trees) of one to the other based on matching. The NLP system identifies aligned terms in the question and the passage that are not in the aligned subgraphs. The NLP system identifies text fragments, for the question and the passage, within the non-aligned segments of their respective parse trees, that connect the aligned term to the aligned portion of the subgraph.

19 Claims, 6 Drawing Sheets

(51) Int. Cl.
  *G06F 16/31* (2019.01)
  *G06F 40/30* (2020.01)
  *G06F 40/211* (2020.01)
  *G06F 40/284* (2020.01)
(52) U.S. Cl.
  CPC ............ *G06F 16/33* (2019.01); *G06F 16/334* (2019.01); *G06F 40/211* (2020.01); *G06F 40/284* (2020.01); *G06F 40/30* (2020.01)
(58) Field of Classification Search
  CPC ......... G06F 17/30634; G06F 17/30312; G06F 17/277; G06F 16/3344; G06F 16/33; G06F 16/22; G06F 16/322; G06F 17/22
  USPC ........................................................ 707/748
  See application file for complete search history.

(56) References Cited

U.S. PATENT DOCUMENTS

| | | | | |
|---|---|---|---|---|
| 2009/0144609 | A1* | 6/2009 | Liang | G06F 40/284 707/999.005 |
| 2010/0138216 | A1* | 6/2010 | Tanev | G06F 40/279 704/9 |
| 2011/0276322 | A1* | 11/2011 | Sandor | G06F 40/134 704/9 |

OTHER PUBLICATIONS

Ganitkevitch et al., "PPDB: The Paraphrase Database", Proceedings of NAACL-HLT 2013, pp. 758-764.
Lin et al., "DIRT—Discovery of Inference Rules from Text", ACM 2001, 6 pages.
Mavuno, "A Hadoop-Based Text Mining Toolkit", http://web.archive.org/web/20130129114203/http://merzlerd.github/mavuno/main/html.com, printed Mar. 10, 2015, 1 page.
Metzler et al., "Mavuno: A Scalable and Effective Hadoop-Based Paraphrase Acquistion System", LDMTA '11, Aug. 24, 2011, 8 pages.
http://nlp.cs.nyu.edu/paraphrase/, "Paraphrase Discovery", printed Mar. 10, 2015, 3 pages.
Shinyama et al., "Automatic Paraphrase Acquistion from News Articles", Proceedings of HLT 2002, Second International Conference on Human Language Technology Research, M. Marcus, ed., Morgan Kaufmann, San Francisco, 2002, 6 pages.
Szpektor et al., "Scaling Web-based Acquistion of Entailment Relations", In Proceedings of EMNLP, Barcelona 2004, 8 pages.
Mell et al., "The NIST Definition of Cloud Computing", National Institute of Standards and Technology, Special Publication 800-145, Sep. 2011, pp. 1-7.
IBM, "This Is Watson", Journal of Research and Development, Including IBM Systems Journal, vol. 56, No. 3/4, May/Jul. 2012, pp. 1-197.
IBM: List of IBM Patents or Patent Applications Treated as Related (Appendix P), May 20, 2016, pp. 1-2.
Boguraev et al., Pending U.S. Appl. No. 15/159,901, filed May 20, 2016, titled "Entailment Knowledge Base in Natural Language Processing Systems," pp. 1-41.
Huang et al., "Inducing Domain-specific Semantic Class Taggers from (Almost) Nothing", Proceedings of the 48th Annual Meeting of the Association for Computational Linguistics, pp. 275-285, Jul. 11-16, 2010.
Ratinov et al., "Design Challenges and Misconceptions in Named Entity Recognition", CoNLL '09, 9 pages, http://cogcomp.cs.illinois.edu/page/software_view/NETagger.
Manning et al., "The Stanford CoreNLP Natural Language Processing Toolkit", Proceedings of the 52nd Annual Meeting of the Association for Computational Linguistics: System Demonstrations, 2014, pp. 55-60.
The Stanford Natural Language Processing Group, "Stanford Pattern-based Information Extraction and Diagnostics (SPIED) Pattern-based entity extraction and visualization", printed on Jan. 7, 2019, 5 pages, https://nlp.stanford.edu/software/patternslearning.shtml.
Alchemyapi, "Entity Extraction API," AlchemyAPI, Sep. 28, 2014 [accessed on Mar. 4, 2021], 4 pages, WayBackMachine, Retrieved from the Internet: <URL: https://web.archive.org/web/20140928122219/http://www.alchemyapi.com/products/alchemylanguage/entity-extraction/>.
Entity Linking with a Knowledge Base: Issues, Techniques, and Solutions; Wei Shen, Jianyong Wang, Senior Member, IEEE, and Jiawei Han, Fellow, IEEE; IEEE Transactions On Knowledge and Data Enginnering vol. 27 No. 2; Year 2015. (Year: 2015).
Stanford NLP Group, "CoreNLP," CoreNLP Overview [online], [accessed on Mar. 4, 2021], 6 pages, Retrieved From the Internet: <URL: https://stanfordnlp.github.io/CoreNLP/>.

* cited by examiner

ENTAILMENT KNOWLEDGE BASE IN NATURAL LANGUAGE PROCESSING SYSTEMS

BACKGROUND

Embodiments of the invention generally relate to electronic natural language processing systems, and more particularly to textual entailment detection.

Traditional computing systems generally have evolved to process structured data. They do not, however, understand what the structured data means, and how it relates to other data, unless this understanding is preprogrammed into the system's functionality. These computing systems are even less capable of meaningfully processing unstructured data. To the extent that they process unstructured data, the processing is rudimentary; there is little insight into what the data means.

Cognitive computing systems, on the other hand, generally derive insight from unstructured data. For example, a natural language processing system, such as n open domain question-answering (QA) system, receives a natural language input, often in the form of a question, attempts to understand the question beyond its immediately known properties, and returns a corresponding answer. QA systems can provide this functionality through several processing techniques and tools, individually or in combination. These techniques include, for example, information retrieval (IR), natural-language processing (NLP), knowledge representation and reasoning (KR&R), machine learning (ML), and human-computer interfaces (HCIs).

One example of a QA system is DeepQA™, a system developed by IBM® Corporation of Armonk, N.Y., as described in *This is Watson*, Ferrucci et al., IBM Journal of Research and Development, Vol. 56, No. 3/4, May/July 2012, incorporated herein by reference in its entirety (all trademarks referenced herein are property of their respective owners). DeepQA's architecture defines various stages of analysis in a processing pipeline. Each stage admits multiple implementations that can produce alternative results. At each stage, alternatives may be pursued independently as part of a massively parallel computation. DeepQA may be implemented based on an assumption that no one processing component perfectly understands the question asked of the system. Rather, DeepQA may generate many candidate answers by searching a variety of sources, on the basis of varying interpretations of the question, and of the question type(s). DeepQA may gather evidence in support of the candidate answers, and evaluates them relative to one another, to arrive at a final answer.

DeepQA may apply hundreds algorithms that analyze evidence along different dimensions, such as type classification (both question type, and lexical answer type), time, geography, popularity, passage support, source reliability, and semantics relatedness. This analysis produces hundreds of features with scores, each indicating the degree to which a bit of evidence supports an answer according to one of these dimensions. Features for a candidate answer can be combined into a single score representing the probability of the answer being correct. DeepQA may also train statistical machine learning algorithms on prior sets of questions and answers to learn how best to weigh each of the hundreds of features relative to one another. The final results of the process may be a ranked list of candidate answers, each with a final confidence score representing the likelihood that the answer is correct, based on the analysis of all of its supporting evidence.

In one implementation, DeepQA may be deployed using the Unstructured Information Management Architecture (UIMA) architecture. UIMA refers to a software system that provides an infrastructure for large-scale analysis of unstructured data to discover useful information. The UIMA architecture may include, in one implementation, a set of three frameworks: the Java Framework, the C++ Framework, and the UIMA-AS Scaleout Framework. The frameworks define a series of interfaces and manage a variety of components and data flows between those components. The components may have different functionalities in analyzing unstructured data. For example, components analyzing unstructured text may include a language identification component, a language-specific segmentation component, a sentence boundary detection component, and a named entity detection component (an entity may be, for example, a person, a company or organization, a geographical place, etc.). Systems using the UIMA architecture may be deployed on a cluster of networked computing nodes, with UIMA having the capability to wrap its components as network services scaled on large volumes by replicating processing pipelines over the cluster.

In a typical example, which will be referenced with respect to embodiments of the claimed invention, a DeepQA system, such as IBM Watson® (hereinafter, "Watson"), may receive a natural language question through an HCl (a human-computer interface). For example, the user may type in a natural language question into a query field in a web browser. Watson may perform one or more of the following general processing steps based on the received question: Question and Topic Analysis & Question Decomposition; Hypothesis Generation; Collecting & Scoring Evidence; Merging Evidence & Combining Confidence; Answer & Confidence Communication. Each of these functions is briefly discussed below.

Question and Topic Analysis & Question Decomposition: to understand the received question, DeepQA may determine what the question is asking for; the question's focus. In determining the focus of the question, DeepQA may identify the word or phrase that indicates the class of the thing the question is asking for, referred to as the question's lexical answer type, or "LAT". Further processing may include further question analysis techniques, such as parsing (shallow, deep, syntactic, logical form, or other parsing), using for example, an English Slot Grammar (ESG) parser and a predicate-argument structure (PAS) generator. ESG may produce a grammatical parse of a sentence and identify parts of speech and syntactic roles such as subject, predicate, and object, as well as modification relations between sentence fragments. The PAS generator may be used to produce a more abstract representation of a parse, suitable for other analytics processing further down the DeepQA processing pipeline.

Hypothesis Generation—Discovering Candidate Answers:

DeepQA may use data outputs from the question and topic analysis and question decomposition processes to generate multiple interpretations of the question, and to generate a variety of corresponding queries. These queries can run against different structured and unstructured sources using a variety of search mechanisms, with complementary strengths and weaknesses. Rather than attempt to directly answer the question at this point in the pipeline, DeepQA generates a broad set of candidate answers. Each candidate answer, combined with the question, may represent an independent hypothesis. Each hypothesis may become the root of an independent process, in the pipeline, that attempts to discover and evaluate supporting evidence in its candidate answer. For example, DeepQA may compute a metric, referred to as candidate binary recall, representing the percentage of questions for which the correct answer is generated as a candidate. This metric may reflect the goal of maximizing candidate recall at the hypothesis generation phase in the DeepQA pipeline.

Hypothesis Generation—Answer Types:

A class of evidence considered by DeepQA may be evidence of whether the answer is of the right type. Type coercion is one technique that may be used. This technique takes a lexical answer type and poses a type hypothesis for each candidate. It then consults a wide variety of structured and unstructured resources using a diverse set of algorithmic techniques to gather evidence for, and against, the type hypothesis. Algorithms designed to use these resources independently quantify a degree of support for believing that the type hypothesis is true.

Collecting & Scoring Evidence:

As described, DeepQA may generate candidate answers and confidence scores that indicate the degree to which each candidate answer is considered to be an instance of the answer type. DeepQA may attempt to collect and score additional evidence. Algorithms designed to perform these functions may be called evidence scorers. These evidence scorers may generate a confidence score—a number that indicates the degree to which a piece of evidence supports or refutes the correctness of a candidate answer. Multiple evidence scorers can work in parallel for each candidate answer, and over different forms of evidence.

One type of evidence is passage evidence—paragraphs or segments of text found in volumes of textual resources that might support the correctness of a candidate answer. Passage evidence may be identified or selected based on a variety of techniques, such as grammar-based techniques and relation extraction techniques. Grammar-based techniques address syntactic and shallow semantic features of language. They look for how the words and structure of language may predict similarities in meaning. Relation extraction techniques look deeper into the intended meaning, attempting to find semantic relationships between concepts, although the concepts may have been expressed with different words, or with different grammatical structures. Relation extraction may be performed using, for example, manually crafted pattern specifications; statistical methods for pattern elicitation; or both.

Merging Evidence & Combining Confidence:

As an example, DeepQA may consider 100 candidate answers for some question. For each of these, DeepQA may find 100 pieces of evidence in the form of paragraphs or facts from databases. Each evidence-answer pair may be scored by 100 independent scorers. Each scoring algorithm produces a confidence. For any one candidate, there may be on the order of 10,000 confidence scores—on the order of 1 million in total for a single question.

At some point in the DeepQA pipeline, DeepQA may rank candidate answers according to their evidence scores, and judge the likelihood that each candidate answer is correct. This may be done using a statistical machine learning framework. This framework may be phase-based, providing capabilities for manipulating the corresponding data and applying machine learning in successive applications to deal with issues such as normalization, training with sparse training data, and merging related or equivalent candidate answers.

Answer & Confidence Communication:

DeepQA may communicate, to the questioning user, a set of scored answers ranked according to their corresponding combined confidence scores. In this manner, the user is provided with a meaningful answer to the user's natural language question that goes beyond mere query generation and execution, and addresses the meaning of the user's question by understanding the question, and its answers.

SUMMARY

According to an embodiment of the invention, a method for generating a textual entailment pair, by an electronic natural language processing (NLP) system, receives first and second texts, and queries a passage database using the first and second texts. The method retrieves a passage from the passage database in response to the query, and selects anchor pairs in the first text and in the retrieved passage. The method generates an entailment pair based on the selected anchor pairs, the entailment pair including a pair of text fragments.

According to a further embodiment of the invention, an NLP system includes a processor and a tangible storage medium for storing program instructions to execute a method for generating a textual entailment pair. The NLP system receives first and second texts, and queries a passage database using the first and second texts. The NLP system retrieves a passage from the passage database in response to the query, and selects anchor pairs in the first text and in the retrieved passage. The NLP system generates an entailment pair based on the selected anchor pairs, the entailment pair including a pair of text fragments.

According to yet another embodiment of the invention, a computer program product for generating a textual entailment pair. The computer program product includes a tangible storage medium storing instructions for execution by a processor of an NLP system. The instructions cause the NLP system to receive first and second texts, and queries a passage database using the first and second texts. The instructions further cause the NLP system to retrieve a passage from the passage database in response to the query, and to select anchor pairs in the first text and in the retrieved passage. The instructions additionally cause the NLP system to generate an entailment pair based on the selected anchor pairs, the entailment pair including a pair of text fragments.

DETAILED DESCRIPTION

Figure 1:
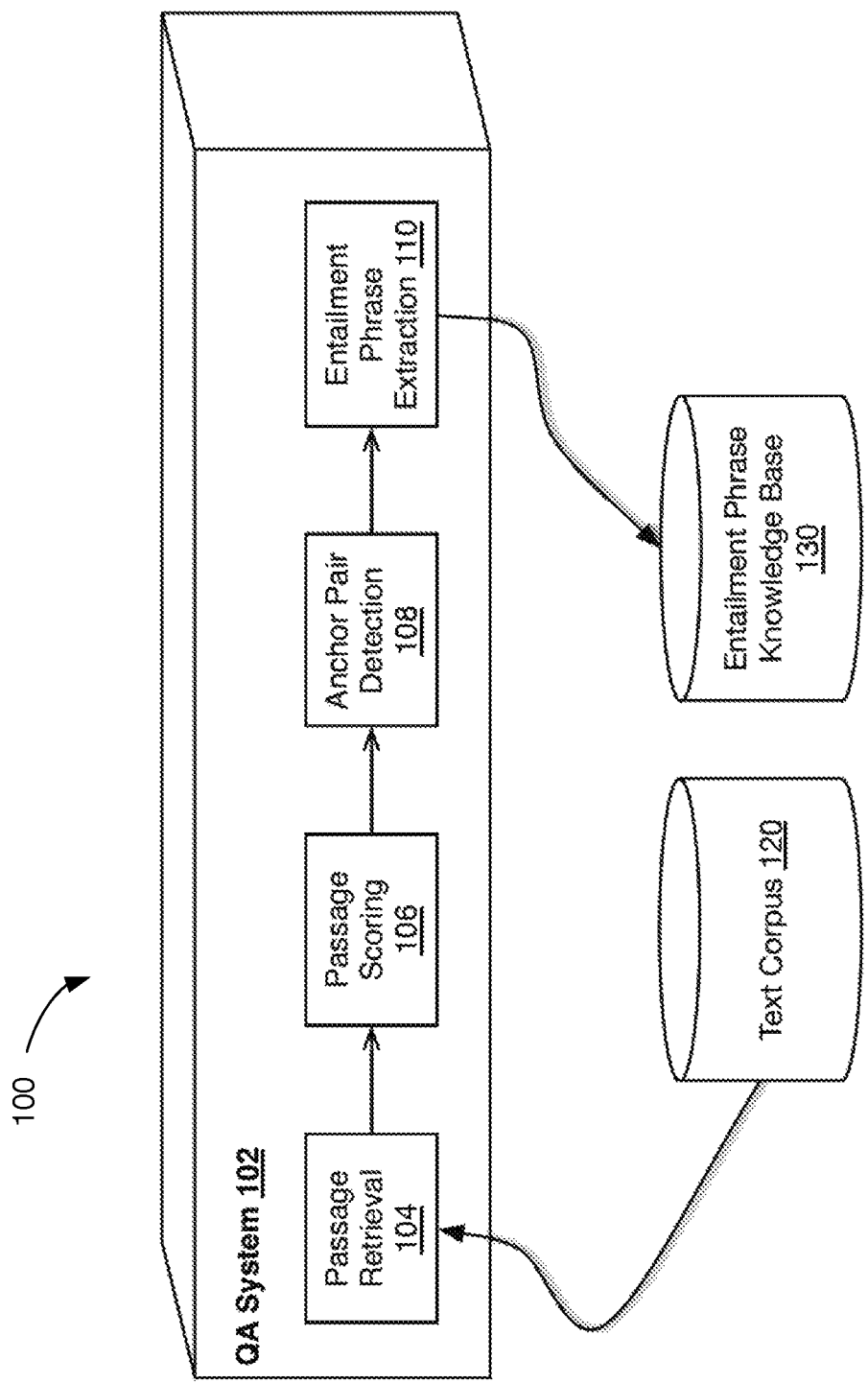
FIG. 1 is a block diagram of a natural language processing (NLP) system, according to an embodiment of the invention.

Natural language processing (NLP) systems, such as Question-answering (QA) systems, analyze natural language text based on text in a text corpus. One example is answering natural language questions. The text in the text corpus, and the likely answer to the question, is also in natural language form. Traditional NLP techniques that rely on techniques such as keyword matching fail to identify the correct answer in instances where the language used in the question does not match the language used in the answer, even though the answer may exist in the corpus, although stated in different words.

A solution that addresses this mismatch, between the text in the question and the text in the answer, is to use textual entailment. Textual entailment refers to a directional relationship between text fragments, where at least one text fragment implies the other. For example, "the car burned down" implies "car is disabled". This need not be true in reverse. For example, "car is disabled" need not imply that "car burned down". Both fragments refer to the same truth, although the fragments may use one or more different words. Textual entailment between a given pair of text fragments defines an entailment pair (also referred to as an entailment phrase). An entailment pair is a defined entailment relationship between one text fragment (such as a word or phrase) and another text fragment. For example, consider the question in EXAMPLE 1, below, presented in natural language form, and its corresponding answer, also in natural language form, which may appear in a corpus. EXAMPLE 1 also includes a list of entailment pairs—words used in the question, and corresponding terms in the answer, which may imply one another under a textual entailment model.

Example 1: Question/Answer Entailment

| Question | Answer |
| --- | --- |
| "What is the hormonal cause of mild elevation of thyroxine and decrease in TSH during the first trimester?" | "Levels of hCG are highest during the first three months of pregnancy, and result in the drop in serum TSH and a mild increase in serum free T4." |
| What [candidate answer] during the first trimester | levels of hCG [question focus] during the first three months of pregnancy |
| mild elevation of thyroxine | mild increase in serum free T4 |
| decrease in TSH | drop in serum TSH |
| cause of | result in |

Words or phrases used in the entailment pairs in EXAMPLE 1 use one or more different words, but in a given pair, each essentially conveys the same truth. For example, "during the first trimester" is defined to entail "during the first three months of pregnancy."

It should be noted that although embodiments of the invention are often described in connection with a QA system, the invention is not limited to QA systems.

In an embodiment, entailment pairs may be tagged and stored, as follows:

Referring to the example entailment pairs above; in the first instance, "is cause of" is paired with "results in". Each is defined as a phrase appearing between two statements describing events. For example, the following two sentences convey the same truth, according to the first entailment pair in the above list: "Event A is the cause of Event B" conveys the same truth as "Event A results in Event B". In the second example in the list, the sentence "Person A took home Award B" conveys the same truth as the sentence "Person A won award B", according to the second entailment pair.

Using entailment pairs to answer natural language questions becomes a challenge considering the number of such phrases that may appear in large text corpora, and variations between different domains to which the text corpora belong. This may be the case, for example, where the same text may support multiple (and even competing or contradictory) entailment pairs, depending on the domain to which it belongs. Developing or obtaining a textual entailment source is time consuming, expensive, and limited by practical considerations.

Accordingly, embodiments of the invention generate textual entailment data. In one embodiment, a QA system may consult the textual entailment data to answer a natural language question using a natural language answer.

FIG. 1 is a block diagram of a computing environment 100, according to an embodiment of the invention. For illustrative purposes, computing environment 100 is described in relation to a QA system 102, text corpus 120, and entailment-phrase knowledge base 130. It shall be apparent to a person of ordinary skill in the art that, although FIG. 1 describes a QA system 102, embodiments of the invention may be practiced independently of a QA system. In an embodiment, computing environment 100 may be a cloud computing environment, and QA system 102 may be a cloud computing node, as described in connection with FIGS. 4-6, below.

Referring now to FIG. 1, each component in computing environment 100 is described below.

QA system 102 may be an electronic question-answering system, such as the DeepQA™ system developed by IBM® Corporation of Armonk, N.Y. QA system 102 may include one or more processing components (also called pipelines) that include, for example, a passage retrieval component 104, a passage-scoring component 106, an anchor-pair-detection component 108, and an entailment pair extraction and scoring component 110 ("entailment component 110"). In an embodiment, this data may be accessed from a data source other than a QA system.

QA system's 102 components are described below in conjunction with the Figures and EXAMPLE 2. This example includes an illustrative question-and-answer pair that QA system 102 may receive (by passage retrieval component 104 or another component), a corresponding query that QA system 102 may generate, a passage returned based on the query (the passage may be one of many stored in text corpus 120), and an entailment pair that QA system 102 may generate based on analysis it performs on the question-answer pair and the returned passage. This

| | | |
| --- | --- | --- |
| <EVENT> is cause of <EVENT> | ← | <EVENT> results in <EVENT> |
| <PERSON> took home<AWARD> | ← | <PERSON> won <AWARD> |
| <ENTITY> has increase in <ENTITY> | ← | <ENTITY> has elevation of <ENTITY> |
| <ENTITY> shows decrease in <ENTITY> | ← | <ENTITY> has drop in <ENTITY> |
| <PERSON> presents with <FINDING> | ← | <PERSON> shows signs of <FINDING> |
| <PERSON> tested positive for <DISEASE> | ← | <PERSON> contracted <DISEASE> | example will be referenced from time to time throughout the remainder of the discussion that follows to illustrate functions of QA system 102 generally, and its various components specifically.

Example 2: Illustrative Question-and-Answer Pair, Query, and Entailment Pair

Question
"What is a common benign cause of congenital hyperbilirubinemia?"
Answer
"Gilbert's Syndrome."
Query
combine [passage20:6] (cause common benign hyperbilirubinemia congenital indirect gilberts syndrome)
Returned Passage
"In many patients, Gilbert's syndrome is commonly a benign explanation for congenital hyperbilirubinemia."
Resulting Entailment Pair
<X> is cause of <Y> ← <X> is explanation for <Y>

Passage Retrieval Component 104

Passage retrieval component 104 generally receives a question-and-answer pair from an input source (the input source may be a user, system, process, or a combination thereof; in one instance, it may be a QA pipeline), constructs an information retrieval (IR) query using the question and its identified correct answer, and retrieves a ranked list of passages from text corpus 120. Text corpus 120 includes textual data, selected for storage in text corpus 120, based on an expected degree of relevance of that textual data to a domain of the question. For example, if the question relates to the healthcare domain, the textual data may be selected based on its expected degree of relevance to healthcare. While embodiments of the invention do not require that the textual data included in text corpus 120 have any minimum degree of relevance to the question's domain, the higher the relevance, the more reliable the resulting analysis may be.

Passage retrieval component 104 may provide an output to one or more other components in QA system 102, including passage-scoring component 106.

Referring to EXAMPLE 2, above, passage retrieval component 104 may receive the question "What is a common benign cause of congenital hyperbilirubinemia?" and the answer "Gilbert's Syndrome" as an input; generate the query "#combine [passage20:6] (cause common benign hyperbilirubinemia congenital indirect gilberts syndrome)"; and retrieve the passage "In many patients, Gilbert's syndrome is commonly a benign explanation for congenital hyperbilirubinemia." In this example, "passage20:6" is part of the query instruction to the passage retrieval engine that tells the retrieval engine what size of passages to retrieve; about 20 word passages by including words in 6 word increments (until sentence boundary is reached).

Passage-Scoring Component 106

Passage-scoring component 106 generally receives an output of passage retrieval component 104, for example the question-and-answer pair and the returned passage in EXAMPLE 2. Functions of Passage-scoring component 106 include term matching.

Given two passages of text (or a question and a passage), term matching determines if pairs of terms in the two passages refer to the same real-world entity. For instance, the term matcher can detect that the term George Washington in the first passage and the term President Washington in the second passage both refer to the same person and hence are "matched" by the term matcher. Similarly, the term matcher would match a term like back pain in the first passage with the term backache in the other passage. The term matcher may (but not necessarily) exhaustively evaluate all pair terms in two passages (one term from one question/passage, and the second term from the other passage), and determines if they match.

In an embodiment, term matching may include applying a variety of term matchers to a pair of terms to determine if they are a match. Each individual term matcher may use a corresponding algorithm to decide if two terms match. One term matcher may decide that two terms are a match if they have the same lexical string (string match). However, term matchers may also use other external resources to decide if two strings match. For instance, one matcher uses a lexical resource such as WordNet® to determine if two terms are synonyms of one another. Synonymous terms may be considered term matches by this matcher. Another matcher may exploit Wikipedia "redirect" information to decide when two entities are the same (e.g., George Washington, GW and President Washington all may redirect to the same Wikipedia page). In the medical domain, a resource such as UMLS may be used to get evidence of term matching. Matching of terms across a pair of passages may then be achieved by applying a collection of term matchers and combining their decisions to identify term matches. Combining decisions from multiple matchers is done through either hand-coded rules, or through a trained machine learning classifier.

In addition to the above term matching, for a question and passage pair, where the passage contains one or more candidate answers to the question, QA system 102 may also have an additional custom term matcher called the "question-candidate" term matcher. This special purpose term matcher matches the "focus term" in the question (usually the wh-word or phrase) with the candidate answer in the passage. Take the following question passage pair as an example:

Q: Which US president came to office during the World War II?
P: Harry Truman took the US presidency when the country was still engaged in WWII.

Assuming "Harry Truman" is a candidate answer, this matcher will match the phrase "Which US president" (the focus of the question) with the candidate term "Harry Truman" in the passage.

Passage-scoring component 106 generates representations ("graphs" or "parse trees," which are used interchangeably here) of syntactic and semantic relationships between terms in pairs of a question and a retrieved passage. Passage-scoring component 106 generates a graph for the question, and a graph(s) for one or more of the retrieved passages. In one embodiment, passage-scoring component 106 may generate a graph for the question, and graphs for all retrieved passages. Based on the generated graphs, passage-scoring component 106 aligns a focus of the question to an answer string in the passage under consideration, in a process referred to as focus-candidate alignment. This may be a subset of the term matching functions that passage-scoring component 106 performs.

Focus-Candidate Alignment—

In the focus-candidate alignment process, a question's focus may refer to the part of the question that, if replaced by the answer, makes the question a standalone statement. For example, in the question "What drug has been shown to relieve the symptoms of ADD with relatively few side effects?", the focus is "drug", since if this word were replaced with the answer—for example, "Adderall"— to generate the sentence "Adderall has been shown to relieve the symptoms of ADD with relatively few side effects", the resulting sentence would be a standalone statement. The focus often, but not always, contains the question's Lexical Answer Type (LAT).

A question may have more than one focus, and more than one portion of the question may be evaluated as a focus candidate. Focus candidates may be generated and evaluated using focus generation and scoring algorithms.

In the focus-candidate alignment process for the question, and the corresponding passage under consideration, QA system 102 may identify one or more strings in the passage for alignment to the focus term(s) in the question. This may include the passage-scoring component 106 generating one or more graphs for the question, and the passage under consideration. Passage-scoring component 106 may also identify focus subgraphs for the question, and for the passage under consideration. A focus subgraph for the question may refer, in an embodiment, to a portion of a question's graph, including connecting edges, that includes the focus term, and all question terms such that the question term is (a) aligned to some passage term, and (b) has an edge connecting the term to the focus term, or to a term in the connected subgraph. In graph 202, for example, the focus term is "What", which aligns with "Gilbert's syndrome", and "is" is directly connected to "What", and is aligned to "is" in the passage. No other terms directly connected to these two terms are aligned to the passage. Therefore, the focus subgraph in this example is subgraph 202A: "What"→"is".

Passage-scoring component 106 may align the subgraphs it identifies based on similarities between nodes in the subgraphs. The alignment may be based on, for example, identical or similar nodes at the same node level; two nodes being identified as equivalent using known entailment pairs; or other criteria. How well two subgraphs align may be the basis for scoring the alignment, which may form the basis for scoring the entailment pair generated by other components of QA system 102.

For each passage analyzed, passage-scoring component 106 may score the passage based on the alignment scores of the focus subgraph. In one embodiment, passage-scoring component 106 may do so by using a decaying sum of term alignment scores in the focus subgraph. The decaying sum is a weighted sum of term alignment scores, where the weights are inversely proportional to the distance of the terms from the candidate term of focus term in the focus subgraph.

Figure 2:
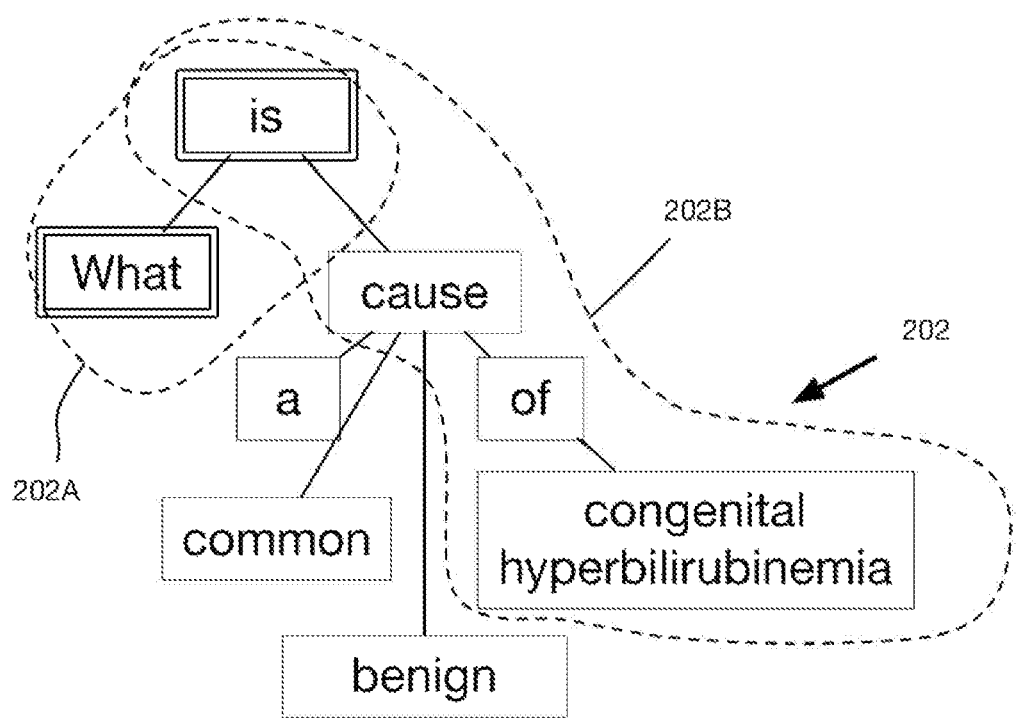
FIG. 2 is a diagram of illustrative parse trees for processing by the NLP of FIG. 1, according to an embodiment of the invention.
Figure 2:
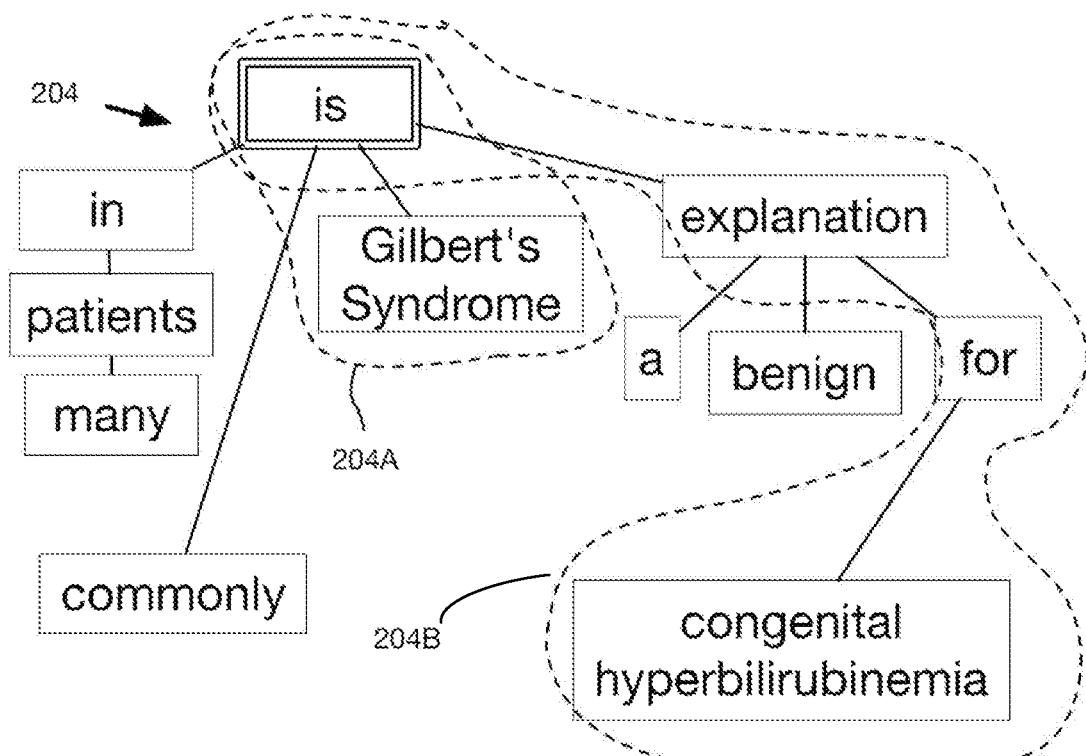

FIG. 2 illustrates two illustrative graphs and corresponding subgraphs for the question and passage in EXAMPLE 2, above. Referring now to FIGS. 1 and 2, and EXAMPLE 2, passage-scoring component 106 generates a question graph 202 and a passage graph 204. Passage-scoring component 106 identifies "what" as a focus term in question graph 202, based on determining that replacing "what" with "Gilbert's syndrome" in the answer would generate the following standalone statement: "Gilbert's syndrome is a cause of benign congenital hyperbilirubinemia".

With continued reference to FIGS. 1 and 2, and EXAMPLE 2, passage-scoring component 106 identifies question subgraph 202A (is→what) and passage subgraph 204A (is→Gilbert's syndrome), and aligns their terms, and their connecting edge(s). Specifically, passage-scoring component 106 aligns "is" to "is", and "what" to "Gilbert's syndrome", and their respective connecting edges. While other subgraphs may be identified here, there is no subgraph with aligned terms that connects "Gilbert's syndrome" to "congenital hyperbilirubinemia". However, since the question and the passage are assumed to convey the same truth, QA system 102 may assume that there is an undetected alignment, which would have been detected had there been an entailment pair defining the relationship between "Gilbert's syndrome" and "congenital hyperbilirubinemia".

Anchor-Pair-Detection Component 108

Anchor-pair-detection component 108 generally receives an output of passage-scoring component 106, for example question graph 202 (including aligned subgraph), and passage graph 204 (including aligned subgraph 204A) in EXAMPLE 2. Anchor-pair-detection component 108 may select pairs of anchor terms from each graph (in an embodiment, for each pair, one anchor term may be selected from each of two corresponding subgraphs). Anchor-pair-detection component 108 may output pairs of anchor terms for processing by other components of QA system 102.

Anchor-pair-detection component 108 generally may select pairs of anchor terms from the question and the passage under consideration. An anchor term generally refers to a term representing an entity that can plausibly be "linked" across passages or questions. Anchor terms may include, for example, terms representing people, organizations, locations, temporal expressions, etc. Additionally, terms belonging to many semantic categories representing physical entities (such as animals, vehicles, buildings, etc.) also may be considered anchor terms.

In an embodiment, to detect anchor terms in a given piece of text, the text may be pre-processed using a Named Entity Detector and a Semantic Class Tagger. Named Entity Detector is an NLP technology that can identify "named entities"—persons, organizations, geopolitical entities (such as countries, cities, etc.)—within the specified text. Similarly, Semantic Class Taggers are NLP technologies that identify the semantic class of terms in the input text. These NLP technologies may be built upon machine learning models trained over human annotated text corpora. Some examples of open source and commercial of Named Entity Detectors available in academia and industry: Stanford CoreNLP, Illinois Named Entity Tagger, Alchemy API Entity Extraction. Examples of Semantic Class Taggers include: Stanford Pattern-based Information Extraction and Diagnostics (SPIED) and Utah Bootstrapped Semantic Class Tagger (all marks are property of their respective owners).

In one embodiment, for a given question and passage, a set of anchor pairs is identified as all pairs of terms that meet all of the following criteria: (1) one term is from the question, and one term is from the passage; (2) the terms are both anchor terms; and (3) the terms have been matched to each other by the term matcher (for example, using the term alignment functions performed by passage-scoring component 106).

In an embodiment, anchor-pair-detection component 108 may select a pair of anchor terms from question graph 202 and passage graph 204, by selecting one anchor term from question subgraph 202A (for example, "what") and one anchor term from question subgraph 204A (for example, "Gilbert's Syndrome"). Similarly, Anchor-pair-detection component 108 may select a pair of anchor terms from question graph 202 and passage graph 204, by selecting one anchor term from nodes in graph 202 but not in subgraph 202A (for example, "congenital hyperbilirubinemia"), and one anchor term from nodes in graph 204 but not in subgraph 204A (for example, "congenital hyperbilirubinemia"). The anchor pairs are, in this example:

Pair 1: ("What", "congenital hyperbilirubinemia");
Pair 2: ("Gilbert's syndrome", "congenital hyperbilirubinemia").

Entailment-Pair-Extraction Component 110

Entailment-pair-extraction component 110 generally receives an input of pairs of anchor terms generated by anchor-pair-detection component 108. Entailment pair extraction component identifies text fragments that connect the anchor terms in the question and the passage, and evaluates them as candidate entailment pairs.

In an embodiment, entailment-pair-extraction component 110 operates by taking advantage of a likelihood that anchor terms in aligned subgraphs of the question and of the answer can serve as hints as to how terms in their non-aligned subgraphs are related, i.e., non-aligned subgraphs likely contain entailment pair candidates. Accordingly, entailment-pair-extraction component 110 extracts entailment pairs from the question and passage graphs using the detected anchor pairs, and scores the extracted entailment pairs. QA system 102 may repeat this process (including additional processes described above in connection with other components) to process the question in relation to additional related passages returned by passage retrieval 104, to assign entailment pair scores to candidates generated by entailment-pair-extraction component 110.

Extracting an entailment pair may include, in an embodiment, identifying text fragments in a graph/subgraph of the question, and text fragments in a graph/subgraph of the passage under consideration, which connect the anchor terms in the question and the passage (for example, subgraphs 202B and 204B). These text fragments may be, for example, nodes in the graphs/subgraphs. In an embodiment, the text fragments may include all nodes connecting the aligned anchor terms on the shortest path to the aligned focus subgraph.

A first fragment, extracted from the question, and a second fragment, extracted from the passage under consideration, define an entailment pair (also referred to as an entailment phrase). The entailment pair may be scored according to various scoring criteria, over successive operations of entailment-pair-extraction component 110, to score and rank the entailment pair.

Scoring functions may vary according to embodiments of the invention. In one embodiment, a given extracted entailment pair may be assigned a score based on the number of times it is extracted by entailment-pair-extraction component 110 for various passages under consideration. For example, if an entailment pair is extracted from a hundred passages, it may receive a higher score than if it had been extracted fifty times.

In an embodiment, the score assigned to an entailment pair may reflect the average rank of the passages from which it is extracted, relative to other passages.

In an embodiment, the score assigned to an entailment pair may reflect the average passage score of the passages from which it is extracted, (for example, the passages' rank may be as determined by passage scoring component 106).

In an embodiment, the score assigned to an entailment pair may reflect the number of different questions whose processing by QA system 102 results in the entailment pair's extraction.

In an embodiment, entailment-pair-extraction component 110 may add one or more of entailment pairs that it extracts to entailment pair knowledge base 130. In an embodiment, entailment-pair-extraction component 110 may add only those entailment pairs whose score meets selection criteria, such as a threshold value.

Referring now to FIGS. 1 and 2, and EXAMPLE 2, above, entailment-pair-extraction component 110 may receive two pairs of anchor terms from anchor-pair-detection component 108, as described above: ("What", "congenital hyperbilirubinemia") and ("Gilbert's syndrome", "congenital hyperbilirubinemia"). Entailment-pair-extraction component 110 acts on the insight that these two anchor pairs are connected by a common anchor term, "congenital hyperbilirubinemia", and that their respective source texts (the question, and the passage under consideration) likely convey the same underlying truth (the likelihood may be measured via a score). Entailment-pair-extraction component 110 additionally acts on the insight that the non-aligned subgraphs of the question and the passage under consideration are likely to contain an entailment pair, which describes the relationship between terms in the non-aligned subgraphs.

In the case of the non-aligned subgraphs in FIG. 2, entailment-pair-extraction component 110 hypothesizes that the phrase "is cause of" entails "is explanation for", and generates the entailment pair "<X> is cause of <Y>←<X> is explanation for <Y>". Entailment-pair-extraction component 110 may assign an initial score of (0.01) to this entailment pair based on extracting it for the first time.

Entailment-pair-extraction component 110 may adjust the score as part of, or through additional, analysis functions. For example, entailment-pair-extraction component 110 may add (0.01) to this initial score for each additional time that it extracts this same entailment pair.

As a further example, entailment-pair-extraction component 110 may maintain a list of passage ranks for each passage whose analysis resulted in extracting the entailment pair (for example, by passage-scoring component 106), and weigh the score accordingly. For instance, as entailment-pair-extraction component 110 extracts the entailment pair from a passage, entailment-pair-extraction component 110 may apply a weighting multiplier to the score of (0.01) to account for a high, neutral, or low passage rank.

As a further example, entailment-pair-extraction component 110 may maintain a list of passage scores for passages from which entailment-pair-extraction component 110 has extracted the entailment pair, and apply a weighting multiplier to the score of (0.01), where the multiplier is determined based on an average passage score.

As a further example, entailment-pair-extraction component 110 may add (0.01) to the score for each question whose analysis results in entailment-pair-extraction component 110 extracting the entailment pair.

Referring now to embodiments of the invention in general, and FIG. 1, QA system 102 may use scoring techniques other than those described above, without departing from the spirit or scope of the disclosed invention. Additionally, although descriptions of QA system 102 refer to pairs of anchor terms, more than two anchor terms may be used. Additionally, entailment pairs may use more than two phrases. Additionally, entailment pairs (or more than two) may be extracted from pairs of retrieved passages, rather than a question and passage pair. Additionally, QA system 102 may perform a combination of these techniques.

With continued reference to embodiments of the invention, in general, the entailment generation functions described above need not be performed using a QA system.

Rather, these functions may be implemented independently from a QA system, and may be used for purposes other than answering questions.

Figure 3:
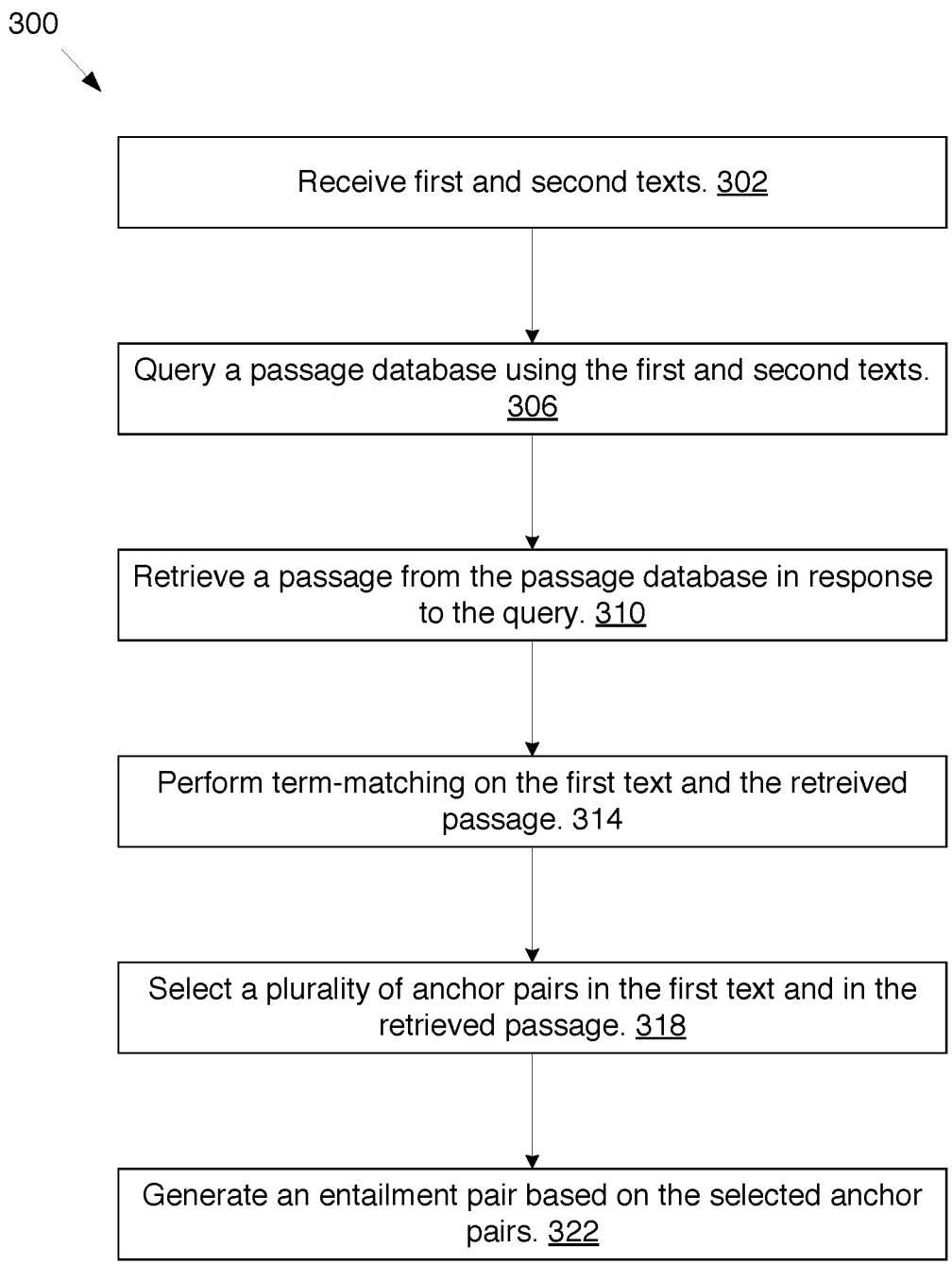
FIG. 3 is a flowchart of a method for generating an entailment phrase, according to an embodiment of the invention.

FIG. 3 is a flowchart of a method 300 for generating a textual entailment pair by an electronic natural language processing system, according to an embodiment of the invention. Steps of method 300 may be implemented using programming instructions executable by a processor in the natural language processing system. In one example, steps of method 300 may be executed by a processor in QA system 102 (FIG. 1).

Referring now to FIGS. 1-3, steps of method 300 will be described in connection with QA system 102 (FIG. 1) and graph 202 and graph 204 (parse trees shown in FIG. 2), according to an embodiment of the inventions.

QA system 102 may receive a pair of texts, which may be referred to as first and second texts (step 302). In one embodiment, the pair of texts may be a question-and-answer (QA) pair: the first text is in the form of a question, and the second text is in the form of a candidate answer. The QA pair may be, for example, the QA pair in EXAMPLE 2 above (Question: "What is a common benign cause of congenital hyperbilirubinemia?"; Answer: "Gilbert's Syndrome."). Other embodiments may include different text pairs.

Passage-retrieval component 104 generates a search phrase based on the first and second texts and queries a passage database (step 306). For example, passage-retrieval component 104 may query text corpus 102 using the query string in EXAMPLE 2, above (Query: "#combine [passage20:6] (cause common benign hyperbilirubinemia congenital indirect gilberts syndrome").

Passage-retrieval component 104 retrieves a passage from the passage database, in response to the query (step 310). For example, passage-retrieval component 104 retrieves the passage in EXAMPLE 2, above (Passage: "In many patients, Gilbert's syndrome is commonly a benign explanation for congenital hyperbilirubinemia.").

Passage-scoring component 106 may perform term matching between terms in the first text and terms in the retrieved passage (step 314). Term matching may be performed based on a term matching criteria. In one embodiment, the term matching criteria may be to match a focus term in the first text to a term in the retrieved passage. Passage-scoring component 106 may score the retrieved passage, relative to the question, based on the term matching, using scoring criteria. The scoring criteria may include, for example, a confidence value associated with the matching; the number of matched terms; the frequency with which different matching algorithms result in the same match; and other criteria.

Passage-scoring component 106 may, in an embodiment, align a text fragment in the first text with a text fragment in the retrieved passage, based on the term matching. The alignment may be based on the passage score. For example, in one embodiment, the alignment between the two text fragments may be performed based on passages whose corresponding alignment scores meet a minimum threshold value.

Passage-scoring component 106 matches at least one term in the first text with at least one term in the retrieved passage. Passage-scoring component 106 may perform this function by generating one or more parse trees of the first text and of the retrieved passage. Passage-scoring component 106 identifies one or more focus terms in the respective parse trees of the first text and the retrieved passage, and identifies one or more focus subgraphs in the first text and one or more subgraphs in the retrieved passage for alignment to the focus subgraphs, based on the term matching. Passage-scoring component 106 may align at least one focus subgraph of the first text with a subgraph of the retrieved passage. In one embodiment, the alignment may be based on how closely focus terms in the focus subgraph match terms in the retrieved passage.

In one embodiment, in the subgraph generation and alignment process, the focus subgraph is a subgraph of the first text's parse tree that includes the focus term in the first text and its parent nodes. Similarly, the subgraph in the retrieved passage (to be aligned to the subgraph of the first text), is a subgraph containing a term matched to the focus term of the focus subgraph (the focus subgraph is a subgraph in the parse tree of the first text).

For example (with reference to EXAMPLE 2 and the graphs in FIG. 2), passage-scoring component 106 identifies "What" as a focus term in the question, and further identifies subgraph 202A as a focus subgraph of graph 202. Passage-scoring component 106 also identifies "congenital hyperbilirubinemia" as a term in the retrieved passage that matches the focus term "What" in the question, and further identifies subgraph 204A in graph 204 as a subgraph of the matched term. Passage-scoring component 106 identifies subgraph 202A and subgraph 204A as aligned subgraphs.

Anchor-pair-detection component 108 selects two or more anchor term pairs in the first text and in the retrieved passage (step 318), where a first anchor term in a given pair is from the first text and a second anchor term in the pair is from the retrieved passage. The selection may be based on detecting anchor terms in the first text and in the retrieved passage using term matching techniques, described above in connection with passage-scoring component 106 (at step 314).

In one embodiment, anchor-pair-detection component 108 selects a first anchor term in the first text matched by a term matcher to a second anchor term in the first text. In one instance, the selection may be based on matching the first anchor term to the second anchor term, where the first anchor term is in the focus subgraph of the first text, and the second anchor term is in a subgraph in the retrieved passage aligned to the focus subgraph of the first text. In another instance, the selection may be based on matching a third anchor term, in the first text, to a fourth anchor term, in the retrieved passage, where the third anchor term appears in a subgraph other than the focus subgraph; the fourth anchor term appears, in the retrieved passage, in a subgraph not aligned to the focus subgraph.

In reference to EXAMPLE 2, above, anchor-pair-detection component 108 identifies as anchor pairs, "What" in the question, and "congenital hyperbilirubinemia" in the retrieved passage, as aligned term, where "What" appears in focus subgraph 202A, and "congenital hyperbilirubinemia" appears in subgraph 204A, where the two subgraphs are aligned. Anchor-pair-detection component 108 also identifies as anchor pairs, "Gilbert's syndrome" in the non-aligned subgraph 202B in the question, and "congenital hyperbilirubinemia" in the non-aligned subgraph 204B.

Entailment-phrase-extraction component 110 may generate an entailment pair (step 322) based on the anchor pairs selected/generated by anchor-pair-detection component 108. Entailment-phrase-extraction component 110 generates the entailment pair by aligning a first text fragment, in the first text, with a second text fragment, in the retrieved passage, based on aligned first and second anchor terms in an first anchor pair, where the first anchor term appears in the first text fragment, and the second anchor term appears in the second text fragment. Entailment-phrase-extraction component 110 aligns a third anchor term in the first text with a fourth anchor term in the retrieved passage, where the third anchor term is not in the first text fragment and the fourth anchor term is not in the second text fragment.

Entailment-phrase-extraction component 110 identifies a third text fragment, in the first text, connecting the third anchor term to the first text fragment, and further identifies a fourth text fragment, in the retrieved passage, connecting the fourth anchor term to the second text fragment.

In an embodiment, for a given text fragment among the third and fourth text fragments, identifying the text fragment includes identifying in a corresponding parse tree (or graph) of a corresponding text (for example, the first text or the retrieved passage), a shortest path (or a subgraph) connecting the anchor term in a non-aligned subgraph to a term in an aligned subgraph.

The third and fourth text fragments identified by entailment-phrase-extraction component 110 constitute an entailment phrase.

Referring more specifically to EXAMPLE 2 and FIG. 2, entailment-phrase-extraction component 110 identifies subgraph 202A and subgraph 204A as aligned subgraphs, and identifies "What" and "Gilbert's Syndrome" as aligned anchor terms in those subgraphs (the alignment itself may, but need not, be performed by another component). Entailment-phrase-extraction component 110 also identifies "congenital hyperbilirubinemia", which is an anchor term in subgraph 202B, as aligned with "congenital hyperbilirubinemia", which is an anchor term in subgraph 204B. Entailment-phrase-extraction component 110 also determines that although these two anchor terms are aligned, they both appear in respective non-aligned portions of subgraph 202 and subgraph 204. Entailment-phrase-extraction component 110 identifies a text fragment connecting "congenital hyperbilirubinemia" in non-aligned subgraph 202B to the term "is" in aligned subgraph 202A, and identifies an additional text fragment connecting "congenital hyperbilirubinemia" in non-aligned subgraph 204B to "is" in aligned subgraph 204A. Each identified text fragment becomes an element in the resulting entailment pair: "<X> is cause of <Y>←<X> is explanation for <Y>".

Referring now to FIGS. 1-3, generally, a natural language processing (NLP) system, such as QA system 102, may receive and analyze multiple text pairs (for example, question-and-answer pairs); retrieve multiple passages in response to queries generated based on the multiple text-pairs; and generate multiple entailment phrases. At one or more stages in this process, the NLP system may rank its results. For example, an entailment phrase may be scored, and ranked according to that score. The score for an entailment phrase may be based on a variety of factors, including, for example, one or more of the following: a score of a passage from which a portion of the entailment phrase is extracted; the number of times the same entailment phrase is extracted using different passages; the number of algorithms whose processing of the same QA pair and passage yield the same entailment phrase; and other factors.

Figure 4:
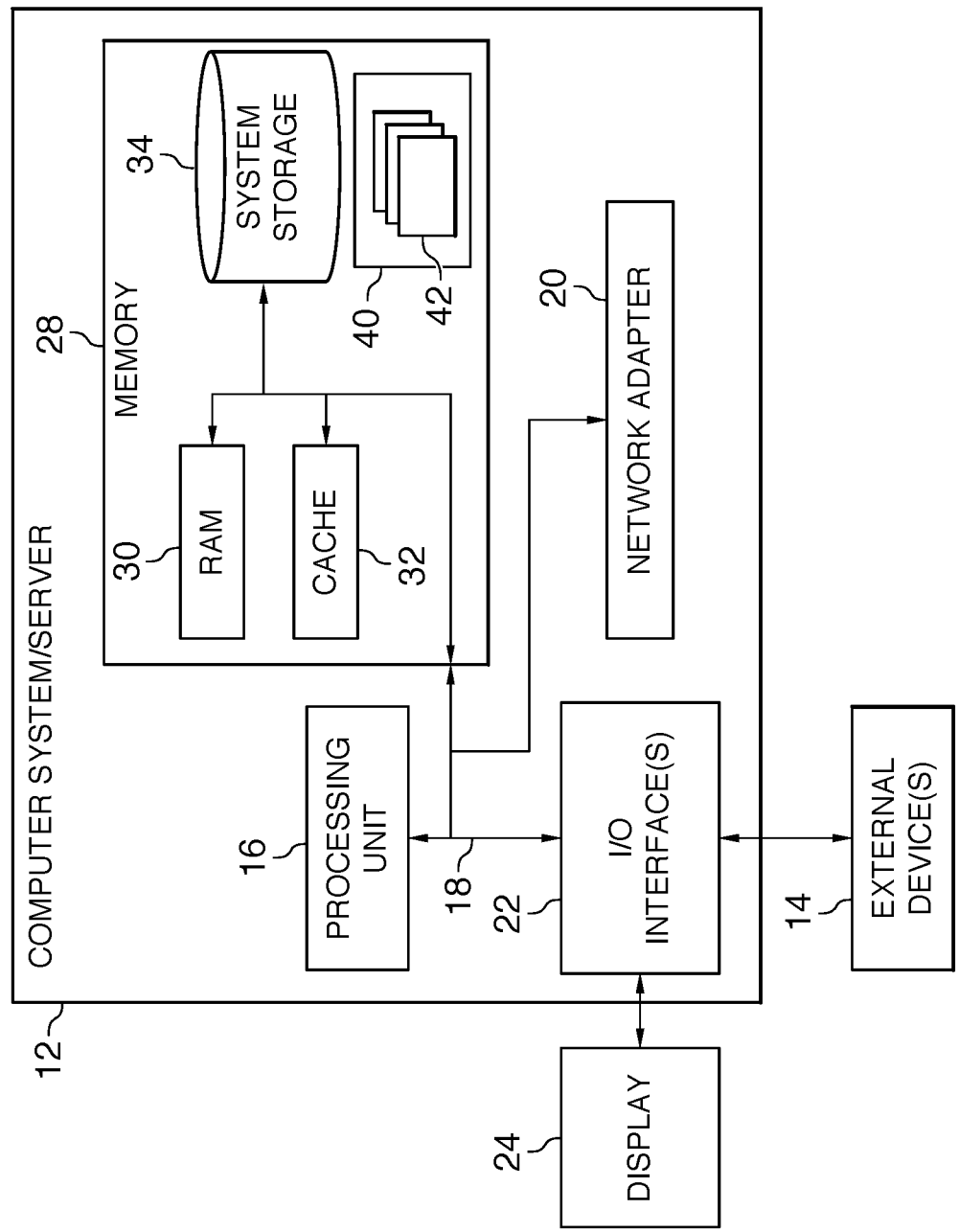
FIG. 4 is a block diagram of a computing device for implementing the NLP system of FIG. 1, according to an embodiment of the invention.

Referring now to FIG. 4, a schematic of an example of a cloud computing node (which may be, for example, QA system 102 in FIG. 1) is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32.

Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
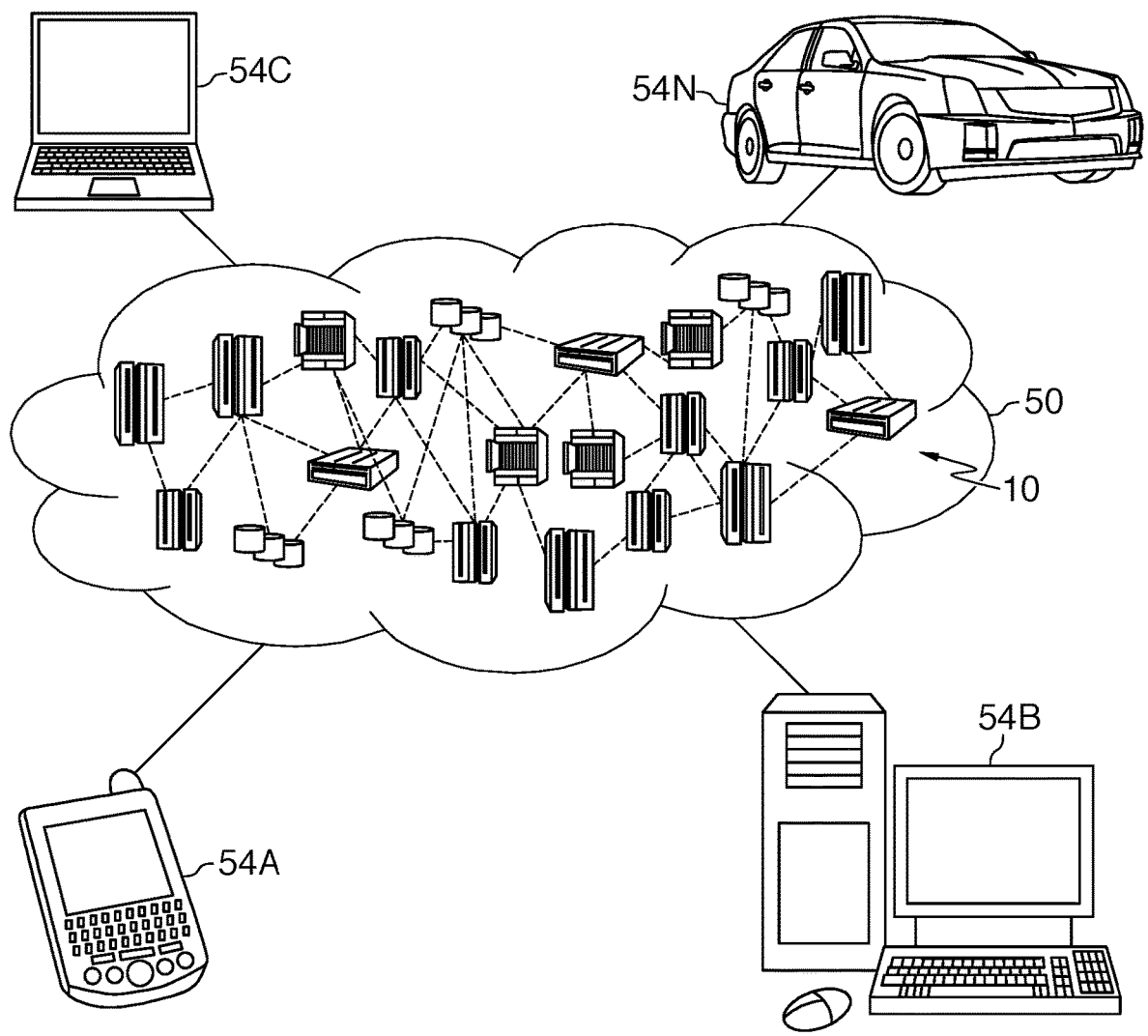
FIG. 5 is a block diagram of an illustrative cloud computing environment, according to an aspect of the invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 50 can communicate with any type of computerized device over any type of network and/or network addressable connection (e.g., using a web browser).

Figure 6:
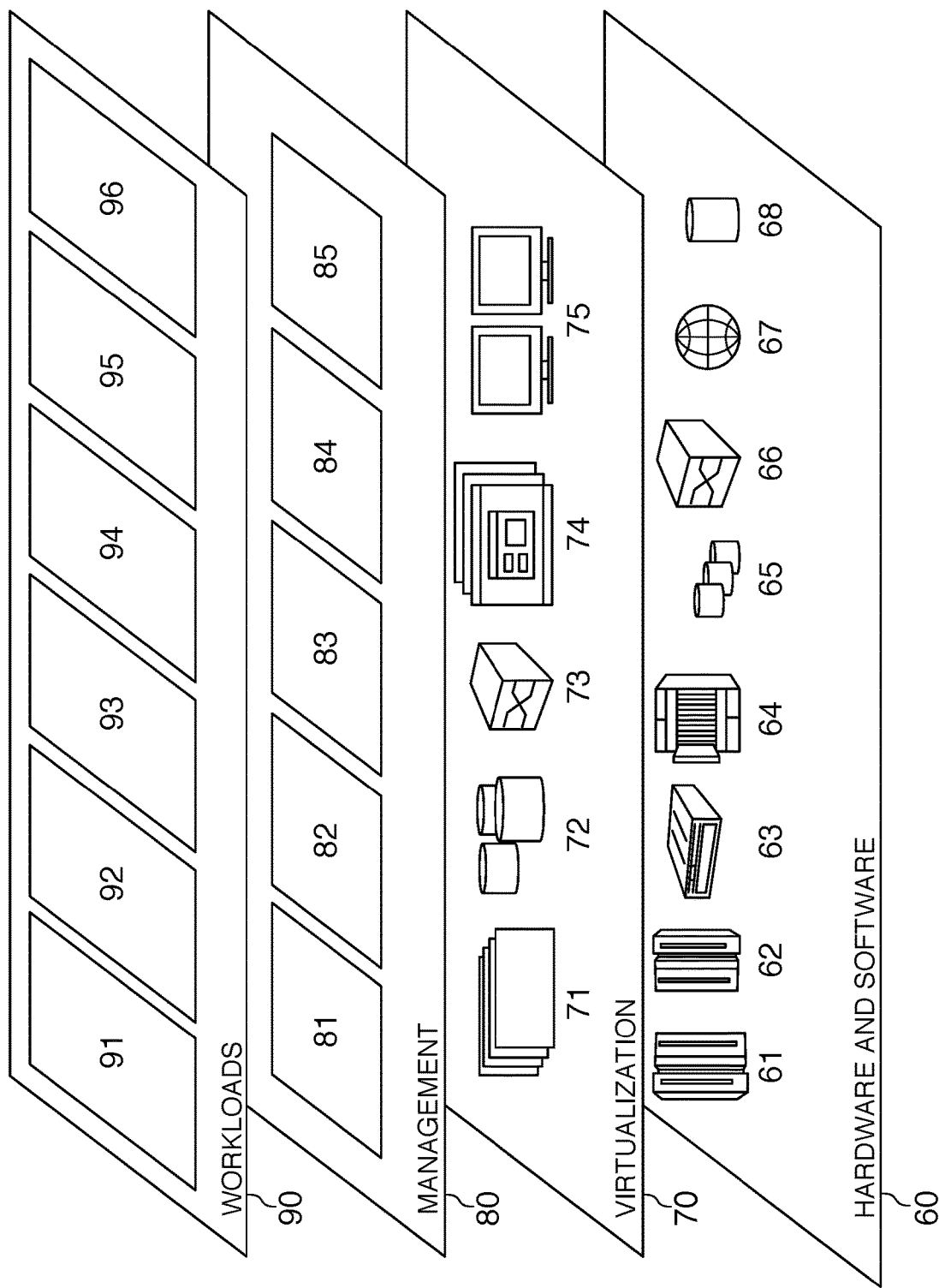
FIG. 6 is a block diagram of functional layers of the illustrative cloud computing environment of FIG. 5, according to an aspect of the invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; natural language processing 96, including those described in connection with FIGS. 1-3, above.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system for generating a textual entailment pair, comprising:

one or more computer devices each having one or more processors and one or more tangible storage devices; and a program embodied on at least one of the one or more storage devices, the program having a plurality of program instructions for execution by the one or more processors, the program instructions comprising instructions for:

receiving first and second texts from an input source, wherein the input source is a QA pipeline;

querying a passage database using the first and second texts using an information retrieval engine in a natural language processing pipeline, wherein the first text is a question and the second text is a candidate answer;

retrieving a passage from the passage database in response to the query using the information retrieval engine in the natural language processing pipeline, wherein the passage is retrieved based on a highest ranking within a ranked list of passages, wherein the ranked list is based on an expected degree of relevance of textual data to a domain of the question;

selecting a plurality of anchor pairs in the first text and in the retrieved passage, using a plurality of term matchers, wherein each of the plurality of term matchers uses a corresponding algorithm to identify a match between a first anchor term in the first text and a second anchor term in the passage retrieved, the anchor pair comprising two anchor terms each corresponding to a term representing an entity linked across at least two passages or two questions;

generating an entailment pair based on the selected anchor pairs, the entailment pair comprising a pair of text fragments, wherein for terms of each of the plurality of anchor pairs, (1) one term is from the question, and one term is from the passage; (2) the terms are both anchor terms; and (3) the terms have been matched to each other by the plurality of term matchers; and assigning a score to the generated entailment pair, wherein the score assigned a first time the entailment pair is generated is an initial score;

retrieving a plurality of additional passages in response to at least one additional query;

performing term-matching between terms in the question and terms in the plurality of additional passages;

scoring the plurality of additional passages retrieved based on the term-matching between the terms in the question and the terms in the plurality of additional passages;

ranking the plurality of additional passages retrieved based on the score of the plurality of additional passages;

generating the entailment pair at least one additional time based on the plurality of additional passages retrieved;

adjusting the score of the generated entailment pair each additional time the entailment pair is generated from the plurality of additional passages, wherein the score is adjusted using a weighting multiplier based on the ranking of the at least one additional passage from which the generated entailment pair is extracted; and storing the generated entailment pair in an entailment database if the score exceeds a threshold value.

2. The system of claim 1, wherein the program instructions further comprise instructions for:

retrieving a plurality of additional passages;

performing term-matching between terms in the question and terms in the retrieved passage and in the plurality of additional passages; and scoring the retrieved passage and the plurality of additional passages based on the term matching, and wherein generating an entailment pair is based on the scoring.

3. The system of claim 1, wherein a passage scorer performs term matching between at least one term in the first text and at least one term in the retrieved passage, and the program instructions further comprise instructions for:

generating one or more parse trees for the first text and the retrieved passage;

identifying one or more focus terms in respective parse trees of the first text and the retrieved passage;

identifying one or more focus subgraphs for the first text and for the retrieved passage based on the identified focus terms; and aligning at least one focus subgraph of the first text with at least one subgraph of the retrieved passage.

4. The system of claim 1, wherein the program instructions further comprise instructions for:

identifying a first anchor term in the first text matched by a term matcher to a second anchor term in the retrieved passage; and designating the first anchor term and the second anchor term as an anchor pair.

5. The system of claim 1, wherein the program instructions further comprise instructions for:

aligning a first text fragment, in the first text, with a second text fragment, in the retrieved passage, based on aligned first and second anchor terms in an first anchor pair, wherein the first anchor term appears in the first text fragment, and the second anchor term appears in the second text fragment;

aligning a third anchor term in the first text with a fourth anchor term in the retrieved passage, wherein the third anchor term is not in the firs text fragment and the fourth anchor term is not in the second text fragment;

identifying a third text fragment, in the first text, connecting the third anchor term to the first text fragment; and identifying a fourth text fragment, in the retrieved passage, connecting the fourth anchor term to the second text fragment, wherein the entailment pair comprises the third and fourth text fragments.

6. A computer program product for generating a textual entailment pair by an electronic natural language processing (NLP) system, comprising a non-transitory tangible storage device having program code embodied therewith, the program code executable by a processor of a computer to perform a method, the method comprising:

receiving first and second texts from an input source, by the NLP system, each corresponding to a natural language text;

querying, by the NLP system, a passage database using the first and second texts using an information retrieval engine in a natural language processing pipeline, wherein the first text is a question and the second text is a candidate answer;

retrieving, by the NLP system, a passage from the passage database in response to the query using the information retrieval engine in the natural language processing pipeline, wherein the passage is retrieved based on a highest ranking within a ranked list of passages, wherein the ranked list is based on an expected degree of relevance of textual data to a domain of the question;

selecting, by the NLP system, a plurality of anchor pairs in the first text and in the retrieved passage, using a plurality of term matchers, wherein each of the plurality of term matchers uses a corresponding algorithm to identify a match between a first anchor term in the first text and a second anchor term in the passage retrieved, the anchor pair comprising two anchor terms each corresponding to a term representing an entity linked across at least two passages or two questions;

generating, by the NLP system, an entailment pair based on the selected anchor pairs, the entailment pair comprising a pair of text fragments, wherein for terms of each of the plurality of anchor pairs, (1) one term is from the question, and one term is from the passage; (2) the terms are both anchor terms; and (3) the terms have been matched to each other by the plurality of term matchers; and assigning, by the NLP system, a score to the generated entailment pair, wherein the score assigned a first time the entailment pair is generated is an initial score;

retrieving, by the NLP system, a plurality of additional passages in response to at least one additional query;

performing, by the NLP system, term-matching between terms in the question and terms in the plurality of additional passages;

scoring, by the NLP system, the plurality of additional passages retrieved based on term-matching between the terms in the question and the terms in the plurality of additional passages;

ranking, by the NLP system, the plurality of additional passages retrieved based on the score of the plurality of additional passages;

generating, by the NLP system, the entailment pair at least one additional time based on the plurality of additional passages retrieved;

adjusting, by the NLP system, the score of the generated entailment pair each additional time the entailment pair is generated from the plurality of additional passages, wherein the score is adjusted using a weighting multiplier based on the ranking of the at least one additional passage from which the generated entailment pair is extracted; and storing, by the NLP system, the generated entailment pair in an entailment database if the score exceeds a threshold value.

7. The system of claim 1, further comprising:

generating a list of passages, wherein the list of passages is comprised of one or more passages from which at least one entailment pair is extracted;

ranking the one or more passages within the list of passages; and adjusting the score of the generated entailment pair using a weighting multiplier based on the ranking of the passage in which the generated entailment pair is extracted.

8. The system of claim 7, wherein the weighting multiplier is based on an average passage score of two or more passages from which the generated entailment pair is extracted.

9. The system of claim 3, wherein aligning the at least one focus subgraph of the first text with the at least one subgraph of the retrieved passage is based on a plurality of term alignment scores of the at least one focus subgraph.

10. The system of claim 9, wherein the plurality of term alignment scores of the at least one focus subgraph are determined using a decaying sum of the plurality of term alignment scores in the at least one focus subgraph.

11. A method for generating a textual entailment pair by an electronic natural language processing system, comprising:

receiving first and second texts from an input source, wherein the input source is a QA pipeline;

querying a passage database using the first and second texts using an information retrieval engine in a natural language processing pipeline, wherein the first text is a question and the second text is a candidate answer;

retrieving a passage from the passage database in response to the query using the information retrieval engine in the natural language processing pipeline, wherein the passage is retrieved based on a highest ranking within a ranked list of passages, wherein the ranked list is based on an expected degree of relevance of textual data to a domain of the question;

selecting a plurality of anchor pairs in the first text and in the retrieved passage, using a plurality of term matchers, wherein each of the plurality of term matchers uses a corresponding algorithm to identify a match between a first anchor term in the first text and a second anchor term in the passage retrieved, the anchor pair comprising two anchor terms each corresponding to a term representing an entity linked across at least two passages or two questions;

generating an entailment pair based on the selected anchor pairs, the entailment pair comprising a pair of text fragments, wherein for terms of each of the plurality of anchor pairs, (1) one term is from the question, and one term is from the passage; (2) the terms are both anchor terms; and (3) the terms have been matched to each other by the plurality of term matchers; and assigning a score to the generated entailment pair, wherein the score assigned a first time the entailment pair is generated is an initial score;

retrieving a plurality of additional passages in response to at least one additional query;

performing term-matching between terms in the question and terms in the plurality of additional passages;

scoring the plurality of additional passages retrieved based on the term-matching between the terms in the question and the terms in the plurality of additional passages;

ranking the plurality of additional passages retrieved based on the score of the plurality of additional passages;

generating the entailment pair at least one additional time based on the plurality of additional passages retrieved;

adjusting the score of the generated entailment pair each additional time the entailment pair is generated from the plurality of additional passages, wherein the score is adjusted using a weighting multiplier based on the ranking of the at least one additional passage from which the generated entailment pair is extracted; and storing the generated entailment pair in an entailment database if the score exceeds a threshold value.

12. The system of claim 1, wherein each text fragment within the pair of text fragments is a node, wherein each node of the pair of text fragments connecting the anchor terms is a shortest path to an aligned focus subgraph.

13. The computer program product of claim 6, wherein each text fragment within the pair of text fragments is a node, wherein each node of the pair of text fragments connecting the anchor terms is a shortest path to an aligned focus subgraph.

14. The method of claim 11, wherein each text fragment within the pair of text fragments is a node, wherein each node of the pair of text fragments connecting the anchor terms is a shortest path to an aligned focus subgraph.

15. The system of claim 1, wherein each of the plurality of additional passages retrieved includes the pair of text fragments connecting the anchor terms.

16. The computer program product of claim 6, wherein each of the plurality of additional passages retrieved includes the pair of text fragments connecting the anchor terms.

17. The method of claim 11, wherein each of the plurality of additional passages retrieved includes the pair of text fragments connecting the anchor terms.

18. The system of claim 1, wherein the program instructions further comprise instructions for:

retrieving the generated entailment pair and at least one other entailment pair from the entailment pair knowledgebase, wherein both the generated entailment pair and the at least one other entailment pair exceed the threshold value; and providing the generated entailment pair and the at least one other entailment pair to a process in the question-answering (QA) pipeline.

19. The computer program product of claim 6, further comprising:

retrieving, by the NLP system, the generated entailment pair and at least one other entailment pair from the entailment pair knowledgebase, wherein both the generated entailment pair and the at least one other entailment pair exceed the threshold value; and providing, by the NLP system, the generated entailment pair and the at least one other entailment pair to a process in the question-answering (QA) pipeline.

* * * * *